US012598279B2

(12) United States Patent
Huang et al.

(10) Patent No.: US 12,598,279 B2
(45) Date of Patent: Apr. 7, 2026

(54) METHOD AND APPARATUS FOR PROCESSING FRAME SEQUENCE AND SYSTEM FOR TREATING VISUAL DYSFUNCTION

(71) Applicant: PRECISION SIGHT (BEIJING) MEDICAL TECHNOLOGY, CO., LTD., Bejing (CN)

(72) Inventors: Xin Huang, Bejing (CN); Mingliang Pu, Bejing (CN)

(73) Assignee: PRECISION SIGHT (BEIJING) MEDICAL TECHNOLOGY, CO., LTD., Beijing (CN)

( * ) Notice: Subject to any disclaimer, the term of this patent is extended or adjusted under 35 U.S.C. 154(b) by 343 days.

(21) Appl. No.: 18/264,048

(22) PCT Filed: Feb. 4, 2021

(86) PCT No.: PCT/CN2021/075300

§ 371 (c)(1),
(2) Date: Feb. 22, 2024

(87) PCT Pub. No.: WO2022/165716

PCT Pub. Date: Aug. 11, 2022

(65) Prior Publication Data

US 2024/0236282 A1     Jul. 11, 2024

(51) Int. Cl.
*H04N 13/161*        (2018.01)
*H04N 13/139*        (2018.01)

(52) U.S. Cl.
CPC .................................. *H04N 13/161* (2018.05)

(58) Field of Classification Search
None
See application file for complete search history.

(56) References Cited

U.S. PATENT DOCUMENTS 4,756,305 A      7/1988 Mateik et al.
2006/0087618 A1  4/2006 Smart et al.
            (Continued)

FOREIGN PATENT DOCUMENTS

CN        103239347 A     8/2013
CN        203539645 U     4/2014
            (Continued)

OTHER PUBLICATIONS

International Search Report and Written Opinion mailed Nov. 8, 2021 for International Patent Application No. PCT/CN2021/075300.
            (Continued)

*Primary Examiner* — Christopher Braniff
(74) *Attorney, Agent, or Firm* — Perkins Coie LLP

(57)            ABSTRACT

The present technology provides a method and apparatus for processing a frame sequence, and a system for treating visual dysfunction. The method comprises: acquiring original frame sequences of a left eye channel and a right eye channel, the original frame sequences comprising a number of groups of consecutive frames, and each group of consecutive frames comprising a variety of repetition frames; and replacing part of the repetition frames in the left eye channel and/or the right eye channel with mask frames, and obtaining target frame sequences of the left eye channel and the right eye channel. When the target frame sequences of the left eye channel and the right eye channel are presented simultaneously, the setting of the mask frames enables the visual stimulus of the original frames of the left eye channel to the left eye to be consistently ahead of or lag behind the visual stimulus from the original frames of the right eye channel to the right eye, and thus the visual stimuli received by the left and the right eye has a stable sequence. The technical solution of the present technology allows reduced
            (Continued)

reliance on hardware devices for producing offsets between the left and right eye visual signals, thereby saving costs while allowing flexible adjustments of parameters to meet the needs of individual users.

20 Claims, 7 Drawing Sheets

(56) References Cited

U.S. PATENT DOCUMENTS

| | | | | |
|---|---|---|---|---|
| 2012/0069296 | A1 | 3/2012 | Li et al. | |
| 2015/0172644 | A1* | 6/2015 | Jung ................... | H04N 13/356 |
| | | | | 348/51 |
| 2020/0054205 | A1 | 2/2020 | Gaier et al. | |

FOREIGN PATENT DOCUMENTS

| | | |
|---|---|---|
| CN | 104717475 A | 6/2015 |
| CN | 109274908 A | 1/2019 |

OTHER PUBLICATIONS

Extended European Search Report mailed Dec. 18, 2024 in European Patent Application No. 21923741.9, 27 pages.

* cited by examiner 10   11                    12              13

Figure 4:
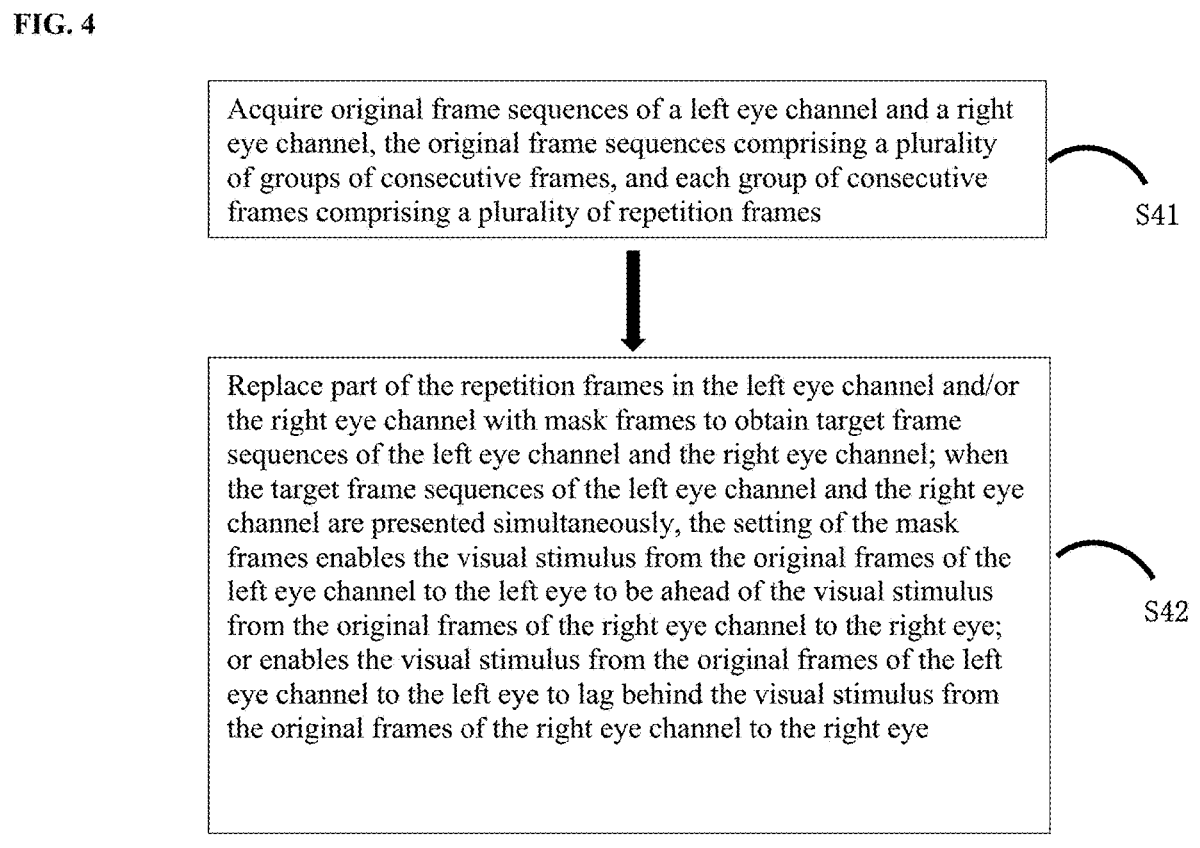

Acquire original frame sequences of a left eye channel and a right eye channel, the original frame sequences comprising a plurality of groups of consecutive frames, and each group of consecutive frames comprising a plurality of repetition frames

S41

Replace part of the repetition frames in the left eye channel and/or the right eye channel with mask frames to obtain target frame sequences of the left eye channel and the right eye channel; when the target frame sequences of the left eye channel and the right eye channel are presented simultaneously, the setting of the mask frames enables the visual stimulus from the original frames of the left eye channel to the left eye to be ahead of the visual stimulus from the original frames of the right eye channel to the right eye; or enables the visual stimulus from the original frames of the left eye channel to the left eye to lag behind the visual stimulus from the original frames of the right eye channel to the right eye

S42

METHOD AND APPARATUS FOR PROCESSING FRAME SEQUENCE AND SYSTEM FOR TREATING VISUAL DYSFUNCTION

CROSS REFERENCE TO RELATED APPLICATIONS

This patent document is a 371 National Phase Application of International Patent Application No. PCT/CN2021/075300, filed Feb. 4, 2021. The entire contents of the above noted application are incorporated by reference as part of the disclosure of this document.

TECHNICAL FIELD

The present technology relates to the field of image communication, and in particular, to a method, apparatus, and system for generating an image frame sequence for treating visual dysfunctions.

BACKGROUND

In a natural environment, light generated by or an image representing a same object enters both eyes of a person at the same time. To enhance a neuron response of one eye to the light or the image, it is necessary to ensure that both eyes receive the light or image at different times. Existing technologies usually use hardware devices such as a signal delay circuit and a delayed optical path to control the time difference between the presentation time to the left eye and the right eye, so as to realize a stable sequence of visual stimuli received by the left eye and the right eye. Such technologies need additional hardware devices such as signal delay circuits and delayed optical paths to be coupled to traditional display devices, resulting in additional costs; secondly, when the time difference between the presentation times to the left eye and the right eye needs to be adjusted, the hardware devices are not flexible enough to adapt to the needs of individual users.

SUMMARY

In view of this, the present technology provides a method and device for processing frame sequences and a system for treating visual dysfunction, so as to reduce the reliance on hardware equipment such as signal delay circuits and delay optical paths, save costs, facilitate flexible adjustment of parameters, and adapt to the needs of individual users.

In a first aspect, the present technology provides a method for processing a frame sequence, including: acquiring original frame sequences of the left eye channel and the right eye channel, wherein each of the original frame sequences includes multiple groups of consecutive frames, and wherein each group of consecutive frames includes multiple repetition frames; replacing part of the repetition frame in the left eye channel and/or the right eye channel with mask frames to obtain a target frame sequence of the left eye channel and a target frame sequence of the right eye channel, wherein the mask frames are set such that when the target frame sequence of the left eye channel and the target frame sequence of the right eye channel are presented at the same time, a visual stimulus from an original frame of the left eye channel to a left eye is ahead of a visual stimulus from an original frame of the right eye channel to a right eye; or, the visual stimulus from the original frame of the left eye channel to the left eye lags behind the visual stimulus from the original frame of the right eye channel to the right eye.

Optionally, the replacing part of the repetition frames in the left eye channel and/or the right eye channel with mask frames includes: determining a mask frame parameter, in which the mask frame parameter can be used to determine the count or number of mask frames and/or the position of the mask frames in the original frame sequence; according to the mask frame parameter, replacing part of the repetition frames in the left eye channel and/or right eye channel with the mask frames.

Optionally, the determining the mask frame parameter includes: receiving the mask frame parameters from a server; or acquiring the mask frame parameters from a local storage.

Optionally, the mask frames include a black frame or a white frame.

Optionally, the mask frames include a frame formed by reducing the brightness and/or contrast of the original frame.

Optionally, the above method further includes: causing a display device to simultaneously present the target frame sequences of the left eye channel and the right eye channel.

Optionally, causing a display device to simultaneously present the target frame sequences of the left eye channel and the right eye channel includes: controlling a presentation time of each target frame sequences of the left eye channel and/or the right eye channel on the display device, such that the presentation time of each frame is the reciprocal of a vertical refresh rate of the display device.

Optionally, the mask frames are set so that when the target frame sequences of the left eye channel and the right eye channel are presented simultaneously, a fixed time difference exists between the visual stimulus to the left eye from an original frame of the left eye channel and that to the right eye from original frame of the right eye channel.

Optionally, the target frame sequences of the left eye channel and the right eye channel both have mask frames, and a same count or number of original frames are positioned between adjacent mask frames in the target frame sequences of the left eye channel and that of the right eye channel.

Optionally, the acquiring the original frame sequences of the left eye channel and the right eye channel includes: obtaining the original frames of the left eye channel and the right eye channel sequence by processing a frame sequence in a compressed image file by frame duplication with a frame rate multiplier of N, wherein, N is determined based on a relationship between the vertical refresh rate of the display device and the frame rate of the compressed image file.

In a second aspect, the present technology provides an apparatus for processing frame sequences, including: a memory configured to store a program of any one of the above methods; a controller configured to execute instructions stored in the memory.

In a third aspect, the present technology provides a machine-readable storage medium, on which instructions for executing any one of the above methods are stored.

In a fourth aspect, the present technology provides a computer program product, on which instructions for executing any one of the above methods are stored.

Finally, the present technology provides a system for treating visual dysfunction, including: a display device for displaying image sequences; and a control device for performing any one of the above methods.

Optionally, the setting of the mask frames enables the amblyopic eye of a user to receive a visual stimulus ahead of the fellow eye of the user.

Optionally, the system is a wearable display device.

Optionally, the mask frames are set so that a fixed time difference exist between the visual stimuli received by the left eye and the right eye form.

Optionally, the time difference is less than or equal to 16 milliseconds.

The method and device for processing frame sequences and the system for treating visual dysfunction provided by this technology allow a stable sequence of visual stimuli received by the left eye and right eye by replacing part of the original frames in the original frame sequence with mask frames. The technical solution provided by the technology can reduce the reliance on hardware devices for generating offsets between visual signals to the left and right eyes, thereby reducing costs while allowing convenient and flexible adjustments of parameters to better meet the needs of individual users.

BRIEF DESCRIPTION OF THE DRAWINGS

Embodiments of the present technology will now be described, by way of example only, with reference to the attached figures, wherein:

FIG. 4 presents a flowchart of a method for processing a frame sequence provided by some embodiments of the present technology.

DETAILED DESCRIPTIONS

The following will clearly and completely describe the technical solutions in the embodiments of the present technology in conjunction with the drawings in the embodiments of the present application. The ensuing description provides exemplary embodiment(s) only, without intending to restrict the scope applicability or configuration of the disclosure. Instead, the ensuing description of the exemplary embodiment(s) will offer those skilled in the art with an enabling description for implementing an exemplary embodiment. It being understood that a variety of changes may be made in the function and arrangement of elements without shifting from the spirit and scope as set forth in the appended claims.

Figure 1:
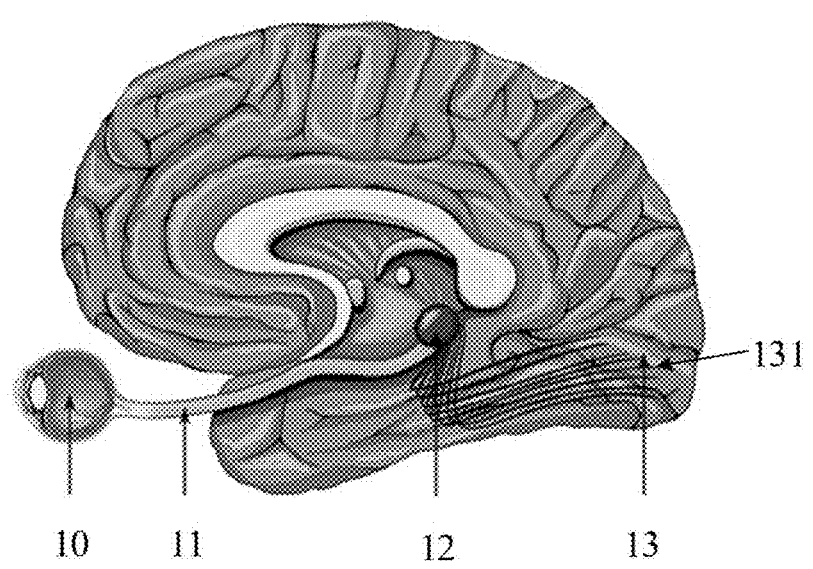
FIG. 1 depicts a diagram of the process of visual signal transmission to binocular neurons in the primary visual cortex.

Light generated by the same object in the natural environment enters both eyes of a person at the same time, including images presented by ordinary desktop monitors, TV screens, mobile phone screens, and passive polarized 3D glasses. When stereopsis is formed, a person extracts visual information including visual disparity through the binocular vision system to assess the distance and depth of objects in the environment. The image of the external three-dimensional world is transmitted to the two-dimensional retina, and the brain uses the subtle spatial disparity of the images on the two retinas to reconstruct the three-dimensional space. As shown in FIG. 1, the image signal received by the eye 10 is transmitted to the lateral geniculate body 12 through the optic nerve 11, and then projected to the primary visual cortex 13. The visual signals of the left and right eyes are processed by a same binocular neuron for the first time in the primary visual cortex 131. The visual responses of neurons to received neural signals demonstrate selectivity, such as the primary visual cortex 131 exhibiting a selective response to disparity. The characteristic of this selective response is plastic. When the synaptic strength between a neuron and other neurons in the neural network changes, the characteristic of this selective response changes accordingly. This process of change is referred to as synaptic plasticity in neurons.

Numerous eye diseases stem from the brain's inability to effectively process visual information, such as amblyopia, glaucoma, myopia, and age-related macular disease, etc. The visual information processing ability of the neurons in the visual cortex can be enhanced by inducing neuronal synaptic plasticity, and light or image presented with a time difference between the two eyes has proved to be effective in inducing the functional restoration of cortical neurons.

Existing technology uses hardware devices such as signal delay circuits and optical delay circuits to regulate the time difference between the presentation time of the left eye and the right eye, so as to achieve a stable sequence of visual stimuli received by the left eye and the right eye. This way of adjusting the time difference relies on additional hardware devices such as signal delay circuit and optical delay element to be used with the traditional display device, resulting in additional hardware costs; secondly, when the time difference between the left eye and the right eye needs to be adjusted, the hardware device is not flexible enough to be adjusted conveniently, and difficult to accommodate the needs of individual users.

To address these, the embodiments outlined in this document offer a method and system designed to achieve a temporal difference in the visual stimuli to the left and right eyes with reduced reliance on hardware devices for offsetting the visual signals to the left and right eyes.

Figure 2:
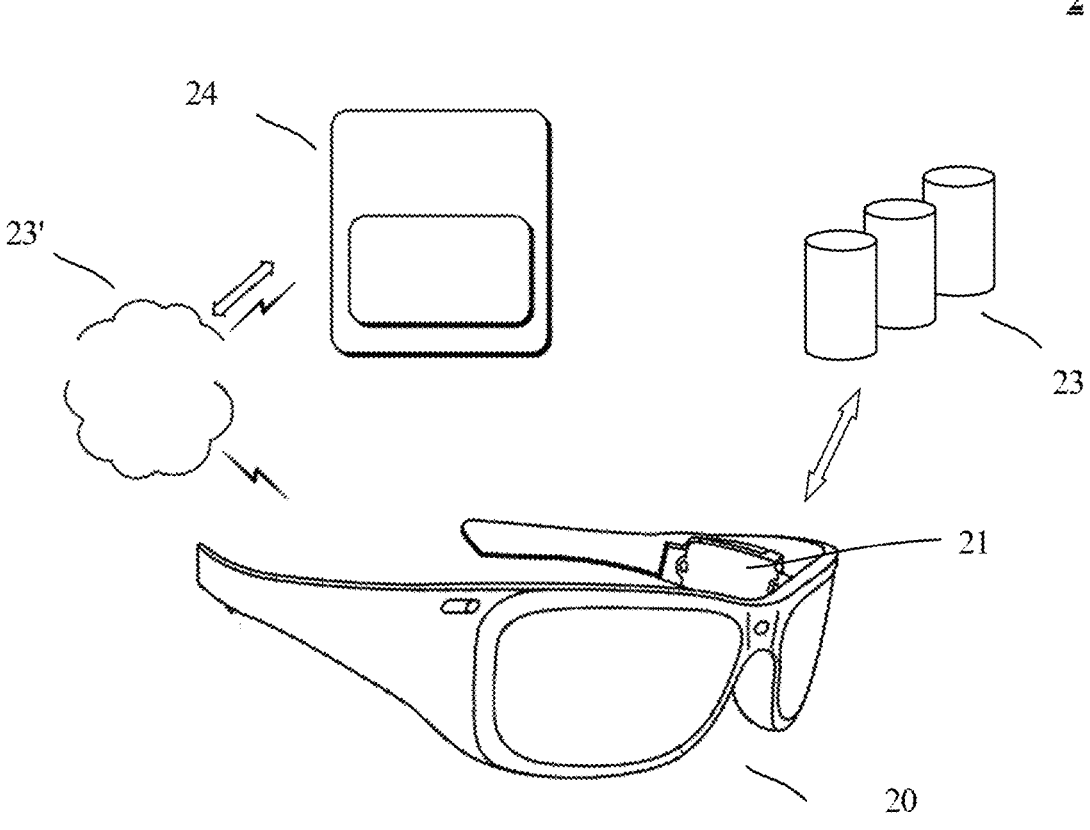
FIG. 2 depicts an example diagram of a system architecture provided by some embodiments of the present technology.

To facilitate understanding, an application scenario of embodiments of the present document is illustrated in FIG. 2.

As an example application scenario according to some embodiments of the present document, as shown in FIG. 2, the system 2 can be used to treat visual dysfunction, and the system 2 can include a display device 20 and a control device 21.

The display device 20 is used to present target frame sequences of the left eye channel and the right eye channel, and the display device 20 may be VR glasses. However, this document is not limited thereto; for example, it may also be a CRT display (cathode ray tube display), an LCD (liquid crystal display), a projector, a VR display helmet, or the like.

The control device 21 can be used to obtain the original frame sequences, and control the display device 20 to simultaneously present the target frame sequences of the left eye channel and the right eye channel, and when the target frame sequences are presented at the same time, a time difference may exist between the visual stimulus from the left eye channel to the left eye and the visual stimulus from the right eye channel to the right eye.

The system 2 may also include a storage system 23, which may store the original frame sequences. Alternatively, the original frame sequences can also be obtained from the server 24 through the communication network 23'. This document is not specifically limited with respect to the type of the server 24; for example, it can be a local server or a cloud server.

To facilitate the understanding of the technical solutions of the present technology, a brief explanation of the terms involved in the embodiments of the present application is given below.

Raw Frame Sequence

The term "original frame sequence" mentioned in this document refers to the frame sequence before a mask frame is added. The original frame sequence may include multiple groups of consecutive frames arranged in temporal order. Each of the multiple sets of consecutive frames may include multiple repeating frames. There may be multiple ways of acquiring the original frame sequence, or ways of generating repetition frames in the original frame sequence, which are not limited to the embodiments of the present document. For example, as an implementation routine, the original frame sequence may be obtained by processing a frame sequence in a compressed image file by frame duplication with a frame rate multiplier of N. The value of N can be selected according to actual needs; for example, it can be determined based on a relationship between the vertical refresh rate of the display device and the frame rate of the compressed image file.

Figure 3:
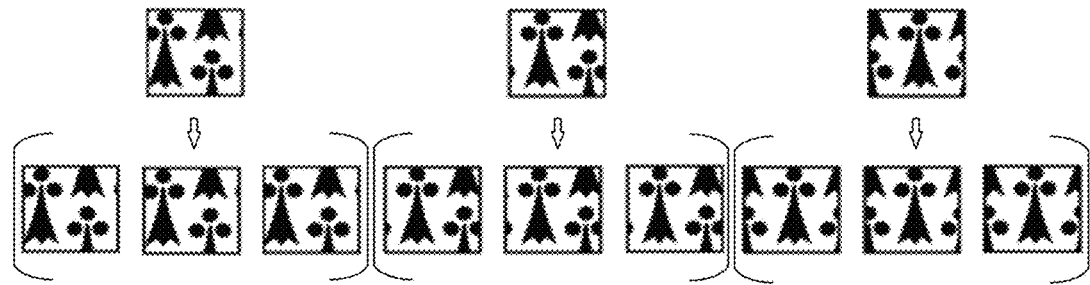
FIG. 3 presents a flowchart of a method for generating an original frame sequence provided by some embodiments of the present technology.

As shown in FIG. 3, taking a compressed image file with 30 FPS (frames per second) as an example (the frame sequence shown in the upper row of FIG. 3), to be displayed on a display device with a vertical refresh rate of 90 Hz, the frames in the compressed image file of 30 FPS (frames per second) need to be multiplied by 3, one frame of image in the compressed image file corresponds to three frames of an identical image on the display device (the frame sequence shown in the lower row of the figure). Accordingly, the original frame sequence is a frame-multiplied frame sequence, in which groups of three identical images are arranged in time sequence, three identical images of a group are consecutive frames, and each group of consecutive frames includes three repetition frames.

This document is not specifically limited with respect to the content of the original frame sequence; for example, it may be a complete sequence or partial sequence of a video, animation, or a sequence formed by combining different graphics and pictures. In this document, the original frame sequences of the left eye channel and the right eye channel may include original frames with the same content or corresponding contents. For example, if a 2D video is played, the original frame sequence of the left eye channel and the original frame sequence of the right eye channel can be the same. As another example, if a 3D video is played, the original frame sequence of the left eye channel contains left eye image frames and the original frame sequence of the right eye channel contains right eye image frames in order to form binocular disparity.

Mask Frame

A mask frame can be used to cover up or hide one or more repetition frames in a group of consecutive frames. The purpose is to make the stimulus from an original frame to one eye always lags behind the stimulus from an original frame to the other eye when the original frames of both the left eye channel and the right eye channel are presented. "Masking" can be achieved by replacing one or more repetition frames in a group of consecutive frames with an existing mask frame; alternatively, "masking" may be achieved by image processing in which a certain frame in a group of consecutive frames that needs to be masked is processed so that its image content is different from that of other frames in the group of consecutive frames.

Furthermore, a "mask frame" mentioned in this document may be one of various types. For example, the mask frame may be a black frame or a white frame, or any other color frame of a hue, lightness, and/or saturation. In other words, the mask frame can be a frame in monochrome or polychrome. Preferably, the mask frame can be a black frame or a white frame; when the mask frame is a black frame or a white frame, the alternate appearance of the original frame and the mask frame can provide a stronger visual stimulus for an eye receiving the original frame earlier.

Alternatively, the mask frame may be a frame obtained by performing image enhancement processing on an original frame. The image enhancement processing refers to an adjustment of one or more parameters such as image contrast, brightness, color saturation, blur, or spatial frequency. Image enhancement processing on a mask frame can differentiate the mask frame and the original frame in one or more of the above parameters, so as to facilitate masking or covering the original frame. The mask frame can also be a frame created by image enhancement processing of a frame of a single color or multiple colors. As an example implementation, a mask frame may be generated by reducing the brightness and/or contrast of an original frame; for example, a mask frame may be generated by reducing both the brightness and contrast of the original frame by 50%. Using the frame formed by reducing the brightness and/or contrast of the original frame as the mask frame can reduce the interference of the blank image of the mask frame on the real image of an original frame in the original frame sequence. Certainly, the present document is not limited with respect to the specific parameters such as contrast and brightness of a mask frame, which can be set according to the preference of different users.

Alternatively, the mask frame may be any other graphic frame determined manually or by various algorithms.

The method for processing a frame sequence provided by the embodiments of the present application are introduced below with reference to FIG. 4 and FIGS. 5a-5d. As shown in FIG. 4, the method for processing a frame sequence includes step S41 and step S42.

Step S41 includes acquiring original frame sequences of the left eye channel and the right eye channel. As shown in FIG. 2, the original frame sequences can be obtained from the storage system 23 or from the server 24, for instance, from a cloud server or a local server.

Step S42 includes replacing part of the repetition frames in the left eye channel and/or the right eye channel with mask frames to obtain target frame sequences of the left eye channel and the right eye channel. For example, how to replace part of the repetition frames with a mask frame can be determined based on the mask frame parameter. The parameters of the mask frame are described in detail later in conjunction with specific embodiments, and are not described in detail here.

The setting of the mask frames may be such that the visual stimulus from an original frame of the left eye channel to the left eye is ahead of the visual stimulus from the original frame of the right eye channel to the right eye when the target frame sequence of the left eye channel and the right eye channel are presented at the same time; or, the visual stimulus to the left eye by the original frame of the left eye channel lags behind the visual stimulus to the right eye by the original frame of the right eye channel.

In some embodiments, the mask frame can be set so that when the target frame sequence of the left eye channel and the right eye channel are simultaneously presented, the visual stimulus from the original frame of the left eye channel to the left eye is different from that from the original frame of the right eye channel to the right eye. A fixed time difference may exist between the visual stimuli to the eyes; that is, a constant time interval can be achieved between the left and right eye channels to enhance the user experience.

As shown in FIGS. 5a-5d, assuming that the presentation time of each frame in the target frame sequence is δt, each group of consecutive frames in the original frame sequence includes three repetition frames, the upper row in the figure is the frame sequence of the left eye channel, and the lower row is the frame sequence of the right eye channel, where non-blank frames represent original frames and blank frames represent masked frames.

Figure 5A:
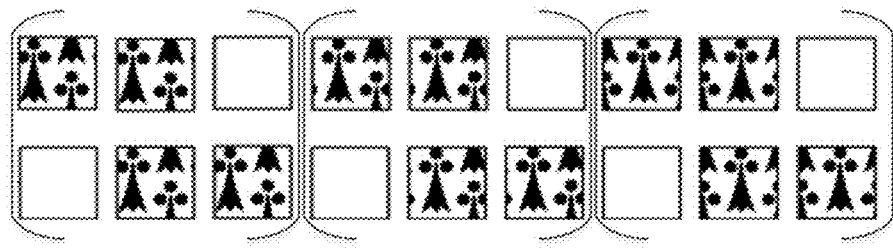
FIG. 5*a*-5*d* exhibits example diagrams of the display sequence of the target frame sequence provided by some embodiments of the present technology.

For example, it is desired to control the image presented in the left eye channel to be always ahead of the image of the right eye channel by a time difference of δt. As shown in FIG. 5a, the third frame of each group of consecutive frames in the left eye channel can be replaced with a mask frame, and at the same time, the first frame of each group of consecutive frames of the right eye channel is replaced with a mask frame, so that the original frame image of the left eye channel is actually always presented ahead of the original frame image of the right eye channel, and the time difference is fixed. That is, the left eye channel leads the right eye channel by one frame interval δt. In addition, when the left eye channel and the right eye channel present the second frame of each group of consecutive frames at the same time, the left eye channel and the right eye channel simultaneously display the corresponding original frame images, and the same contents may be displayed, or corresponding contents that induce disparity may be displayed.

Figure 5B:
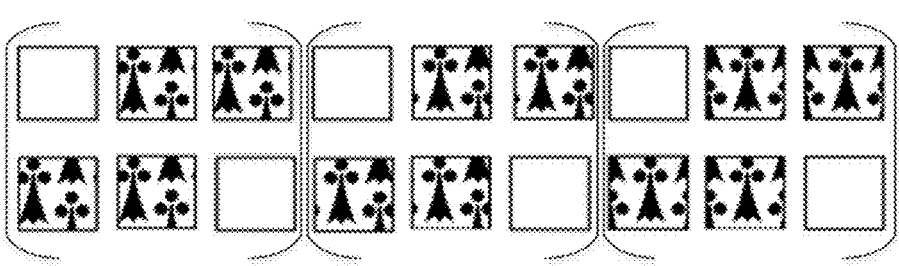

Conversely, when the objective is to maintain a constant time lag of δt between the presentation of the image in the left eye channel and that in the right eye channel, as shown in FIG. 5b, a different approach can be adopted. In this scenario, the first frame within each group of consecutive frames in the left eye channel with a mask frame, also replace the third frame of each set of consecutive frames in the right eye channel with the mask frame.

Figure 5C:
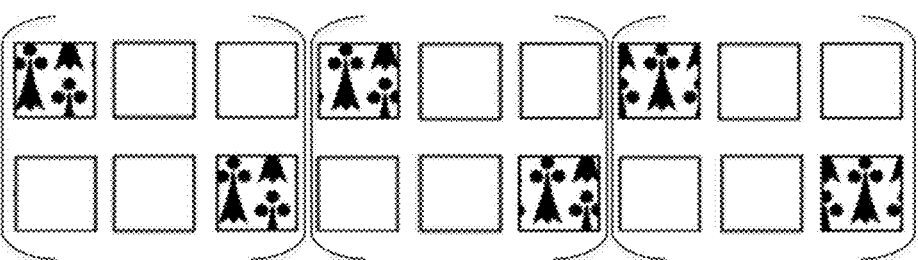
Figure 5D:
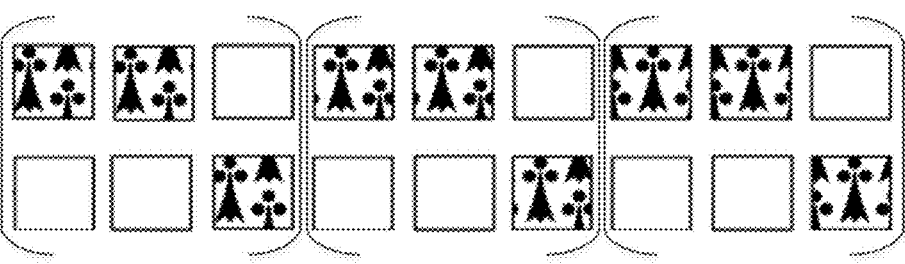

To maintain a constant time difference of 2δt according to which the images presented in the left eye channel are ahead of the images of the right eye channel by two frames, the second and third frames of each group of consecutive frames in the left eye channel can be replaced by a mask frame, respectively, as illustrated in FIG. 5c. Simultaneously, the first and second frames of each group of consecutive frames in the right eye channel are replaced with a mask frame, respectively. According to another implementation as shown in FIG. 5d, the third frame in each group of consecutive frames of the left eye channel is replaced with the mask frame, while the first and second frames of each group of consecutive frames in the right eye channel are replaced with the mask frame, respectively.

The cumulative effect of a sufficient duration can effectively enhance the neuronal response of the eyes to light or presented images, thereby inducing synaptic plasticity of neurons. Therefore, the neuron response of the eyes to light or presented images can be effectively enhanced by setting an alternate arrangement of the original frame and the mask frame in the target frame sequence to bring about a cumulative effect over time. As an example implementation, the target frame sequences of the left eye channel and the right eye channel may have mask frames, and repetition frames in each group of consecutive frames may be replaced with mask frames. As shown in FIG. 5a-5d, to achieve a fixed time difference between a visual stimulus to the left eye from an original frame of the left eye channel and a visual stimulus to the right eye from an original frame of the right eye channel when the target frame sequences of the left eye channel and the right eye channel are presented at the same time, each of the target frame sequences of the left eye channel and the right eye channel may be set such that a same number of original frames situated between adjacent mask frames in the target frame sequence.

In some embodiments, the method for processing frame sequences provided by this application can be directly implemented by applying corresponding control programs to the controller without using additional hardware devices such as signal delay circuits and optical delay circuits, and replacing part of the original frames in the original frame sequence with mask frames based on a mask frame parameter, to achieve a time difference between the visual stimuli received by the left and right eye channels. In some embodiments, a control program for executing the method for processing a frame sequence provided in this document may store on hardware such as a chip.

According to the method for processing a frame sequence provided by the embodiments of the present document, the image frame presentation terminal may use mask frames to replace part of the repetition frames in the original frame sequence so that when displayed on a terminal for presenting image frames, such frame sequences may establish a fixed time difference between a visual stimuli received by the left eye and the right eye. The technical solution provided by this technology can reduce the reliance on hardware devices for generating an offset between the visual signals to the left and right eyes, thereby saving costs; at the same time, the technology allows parameters to be adjusted conveniently and efficiently, thereby allowing various time intervals to be achieved between the left and right eye channels to meet the needs of individual users.

Figure 6:
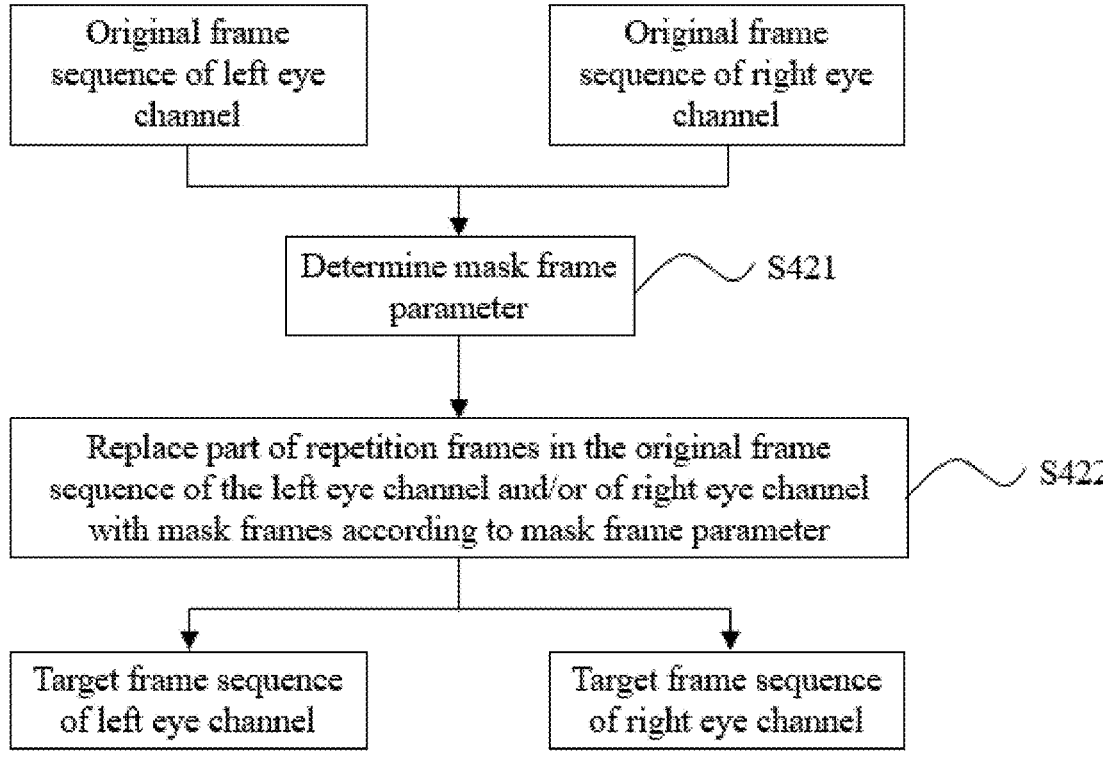
FIG. 6 presents a flowchart of a method for processing a frame sequence provided by some embodiments of the present technology.

As shown in FIG. 6, in step S42, replacing part of the repetition frames in the left eye channel and/or the right eye channel with mask frames further includes step S421 and step S422. Step S421 includes determining a mask frame parameter, so as to determine the number of mask frames and/or the position of the mask frames in the original frame sequence.

The present document is not specifically limited with respect to the number of mask frames and their positions in the original frame sequence. Regarding the number of mask frames, in each group of consecutive frames, the number of mask frames needs to be smaller than the number of frames included in the consecutive frames. That is to say, if there are M repetition frames in each group of consecutive frames, the number of frames included in the group of consecutive frames is M, and the number of mask frames in each group of consecutive frames is less than M. For instance, in the original frame sequence of the left eye channel and the right eye channel, the number of mask frames used to replace the original frame can be 0, which means that the left and right eyes see the presented frame images of the original frame sequences at the same time; or, one or more mask frames may be used to replace part of the original frames in the original frame sequence. The mask frames may include one blank frame or multiple blank frames; certainly, the mask frames may include frames obtained by performing image enhancement processing on one or more original frames.

Alternatively, some of the repetition frames in only one of the left and right eye channels may be replaced with mask frames. For example, some repetition frames in the left eye channel can be replaced with mask frames, then the target frame sequence presented by the right eye channel is the same as the original frame sequence of the right eye channel. In this case, a stable sequence of visual stimuli may be achieved by presenting target frame sequences of the left eye channel and the right eye channel.

Similarly, as for the position of the mask frame in the original frame sequence, when a mask frame of the left eye channel appears later than a mask frame of the right eye channel, it means that the left eye receives an original frame image ahead of the right eye; whereas, when a mask frame of the left eye channel appears earlier than a mask frame of the right eye channel, the left eye receives the presented original frame image later than the right eye. When there is no mask frame at the same position of the left eye channel and the right eye channel, both eyes receive the presented original frame image at the same time. In other words, the position of a mask frame between the left eye channel and the right eye channel in the original frame sequence is an adjustable parameter. By adjusting this parameter, the sequence and time difference between the image frames of the left and right eye channels can be adjusted. The adjusted time difference is a multiple of the presentation time of each frame of the display device. For example, on a display device with a vertical refresh rate of 90 Hz, the presentation time of each frame is ⅟₉₀ second; that is, 11.1 milliseconds, and the adjustable time difference may be 11.1 milliseconds, 22.2 milliseconds, etc.

There are many sources for obtaining a mask frame parameter, which is not limited in this document. As an example implementation as illustrated in FIG. 2, a mask frame parameters from the server 24 may be transmitted to the display device through the communication network 23', or the parameters can be sent together with the compressed image file through the communication network 23' to a terminal device. The server 24 can be a cloud server or a local server. Alternatively, the mask frame parameters can be stored in the local storage system 23, and the parameters can be retrieved according to instructions before displaying.

Step S422 includes replacing partial of the repetition frames in the left eye channel and/or the right eye channel with mask frames according to the mask frame parameters.

For the original frame sequence of the left eye channel and the original frame sequence of the right eye channel, the number of mask frames and/or the positions of the mask frames in the original frame sequence can be calculated according to the mask frame parameters. An original frame in an original frame sequence can be replaced with a mask frame at the corresponding position to generate the target frame sequence for the left eye channel and for the right eye channel. By adjusting the number of mask frames and/or the positions of the mask frames in an original frame sequence, a stable sequence in visual stimuli to both eyes may be achieved, and at the same time, various time differences can be achieved, and the time differences are adjustable.

As an example, the target frame sequences of the left eye channel and the right eye channel can be presented simultaneously using a display device. This document is not limited with respect to the type of display device, such as VR glasses, CRT display (Cathode Ray Tube), LCD (Liquid Crystal Display), projector, VR display helmet, etc.

When a display device is used to present the target frame sequences of the left eye channel and the right eye channel at the same time, the presentation time of each frame in the target frame sequence of the left eye channel and/or the right eye channel on the display device is determined based on the reciprocal of vertical refresh rate of the display device. For example, when the vertical refresh rate of the display device is 90 Hz, the presentation time of each frame in the target frame sequence is ⅟₉₀ second. In such cases, the presentation time of the frames of the target frame sequence presented on the display device may be synchronized with the vertical synchronization signal (VSYNC signal) of the device. This synchronization mechanism may ensure that the display device exhibits an entire image frame in each refresh cycle, thereby avoiding screen tearing.

Figure 7:
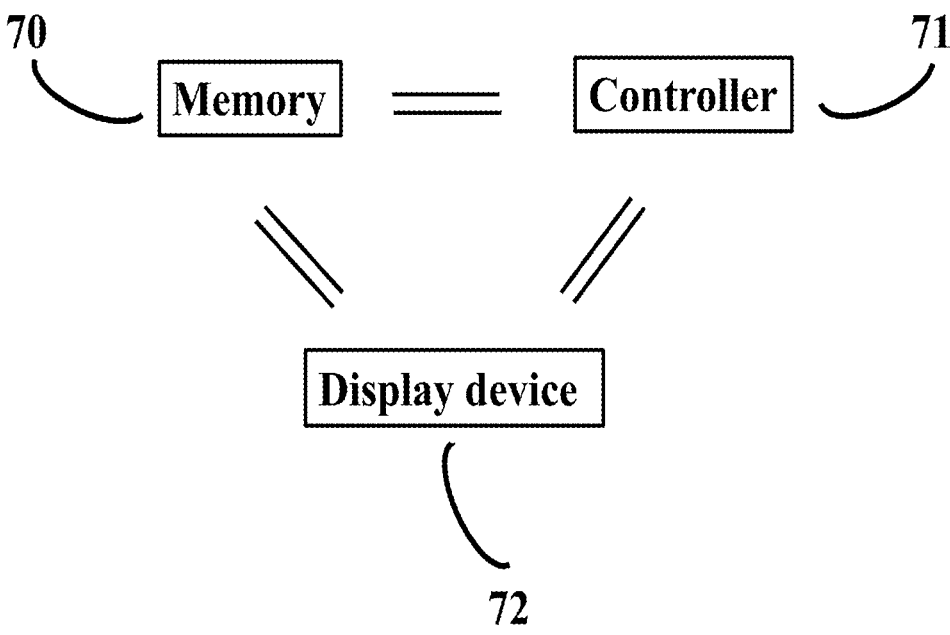
FIG. 7 depicts a schematic structural diagram of an apparatus for processing a frame sequence provided by some embodiments of the present technology.

In another aspect, embodiments of the present document include an apparatus 7 for processing a frame sequence. As illustrated in FIG. 7, the device 7 for processing frame sequences includes: a storage device 70 and a controller 71.

The storage device 70 is used to store the program of any one of the above-mentioned methods proposed in this application. The controller 71 is connected with the memory 70 for executing instructions stored in the storage device 70.

The device 7 for processing a sequence of frames may also comprise a display device 72. The storage device 70 and the controller 71 can be integrated on the display device 72, and can also be connected to the display device 72 via a wired or wireless connection. The controller 71 uses the display device 72 to simultaneously present the target frame sequences of the left eye channel and the right eye channel.

In a third aspect, embodiments of the present documents provide a machine-readable storage medium, on which instructions for executing any one of the above methods are stored.

In a fourth aspect, embodiments of the present document provide a computer program product, on which instructions for executing any one of the above methods are stored. In addition, the present document also provides a system 2 for treating visual dysfunction, on which a device 7 for processing frame sequences is installed. As illustrated in FIG. 2, the treatment system 2 includes: a display device 20 and a control device 21. The display device 20 is used for displaying image sequences. The device can be VR glasses, 2D glasses or 3D glasses, but not limited thereto. The control device 21 is integrated on the display device 20, and can also communicate with the display device 20. For example, the control device 21 and the display device 20 can be connected via a wired or wireless connection. In the case of wireless connection, wireless connection technologies such as WIFI and Bluetooth can be used.

The control device 21 can be used to obtain the original frame sequence. For example, the original frame sequence may be obtained by processing a compressed image file by frame duplication with a frame rate multiplier of N. After acquiring the original frame sequence, the control device 21 calculates the mask frame parameters, and replace the original frames at the corresponding positions with mask frames according to the calculation result to generate a target frame sequence. Finally, the control device 21 causes the control display device 20 to simultaneously present the target frame sequences of the left and right eye channels, so that a visual stimulus from an original frame of the left eye channel to the left eye of the user of the display device 20 is ahead of the visual stimulus from an original frame of the right eye channel to the right eye of the user. Alternatively, a visual stimulus to the left eye from an original frame of the left eye channel lags behind a visual stimulus to the user's right eye from an original frame of the left eye channel.

The visual dysfunction treatment system 2 of the present document allows flexible adjustments of parameters by setting mask frames in the original image frame sequence, so that between the left eye and the right eye, the eye that cannot process visual information normally can receive visual stimuli first. By flexibly regulating the time difference between visual stimuli to both eyes, the synaptic plasticity of binocular cells in the visual cortex can be enhanced, thereby improving the visual function of the diseased eye. Therefore, this system 2 for treating visual dysfunction can be used to treat amblyopia, glaucoma, myopia, age-related macular degeneration, and other eye diseases. For example, if a patient has amblyopia in the left eye, by setting the position of the left eye mask frame to always lag behind the position of the right eye mask frame, it can ensure that the patient's left eye receives a visual stimulus first, so as to improve the visual function of the patient's left eye.

Only when the left and right eye visual signals to be processed by the binocular neurons are kept within a certain time range can the correlation between the left and right eyes be properly processed and a stable stereoscopic perception be formed. Otherwise, if the time difference between the left and right eye visual signals arriving at the binocular neurons is excessive, binocular neurons may be unable to process disparity information properly, which may cause problems such as visual perception impairment. Therefore, in the present document, the time difference is limited to be less than or equal to 16 milliseconds (≤16 ms).

Referring back to FIG. 2, the system 2 is a wearable display device. The wearable device may include various types of glasses or head-mounted displays, including process frame sequence device 7, eye therapy devices, VR glasses, 2D glasses or 3D glasses etc.

Referring back to FIG. 2, system 2 may also include storage system 23. The storage system 23 is connected to the control device 21 and is used for locally storing frame sequences and/or mask frame parameters.

The storage system 23 can also be replaced by a combination of a communication network 23' and a server 24. The communication network 23' may be operably connected to the control device 21, via which the frame sequences and/or mask frame parameters stored in the server 24 may be transmitted to the control device 21 and the frame sequences and/or mask frame parameters from the control device 21 to the display device 20. In addition, via the communication network 23' the original frame image sequence may be downloaded from the server 24. This document is not limited with respect to the type of server, which can be a cloud server or a local server. Compared with existing systems for treating visual dysfunction, the visual dysfunction treatment system 2 of this document can reduce the time difference between the frame sequences presented to the left and right eye channels using hardware devices such as signal delay circuits and optical delay circuits, and save costs, and it is convenient to adjust the parameters flexibly to meet the needs of individual users.

The above describes some embodiments of the document, and is not intended to be limiting. Any alterations, analogous substitutions, and the like, made in accordance with the essence and principles of this document is within the scope of protection encompassed by this document.

What is claimed is:

1. A method for processing frame sequences, comprising:
   acquiring an original frame sequence of a left eye channel and an original frame sequence of a right eye channel, wherein each of the original frame sequence includes multiple groups of consecutive frames, and wherein each group of consecutive frames includes multiple repetition frames; and replacing part of the repetition frames in the left eye channel and/or the right eye channel with mask frames to generate a target frame sequence of the left eye channel and a target frame sequence of the right eye channel, wherein the mask frames are set so that when the target frame sequences of the left eye channel and the right eye channel are simultaneously presented, a visual stimulus from an original frame of the left eye channel to a left eye is ahead of a visual stimulus from an original frame of the right eye channel to a right eye; or, a visual stimulus from an original frame of the left eye channel to the left eye lags behind a visual stimulus from an original frame of the right eye channel to the right eye.

2. The method of claim 1, wherein replacing part of repetition frames in the left eye channel and/or right eye channel with the mask frames comprises:
   determining a mask frame parameter to be used for determining a count of the mask frames and/or positions of the mask frames in the original frame sequence; and
   replacing the part of the repetition frames in the left eye channel and/or the right eye channel with the mask frames according to the mask frame parameter.

3. The method of claim 2, wherein determining the mask frame parameter comprises:
   receiving the mask frame parameter from a server; or acquiring the mask frame parameter from a local storage.

4. The method of claim 1, wherein the mask frames comprise a black frame, a white frame, or a frame formed by reducing brightness and/or contrast of an original frame.

5. The method of claim 1, further comprising: causing a display device to simultaneously present the target frame sequences of the left eye channel and the right eye channel, respectively.

6. The method of claim 5, wherein causing a display device to simultaneously present the target frame sequences of the left eye channel and the right eye channel comprises: controlling a presentation time of each frame in the target frame sequence of the left eye channel and/or the right eye channel on the display device, so that the presentation time of each frame is a reciprocal of a vertical refresh rate of the display device.

7. The method of claim 1, wherein the mask frames are set so that when the target frame sequences of the left eye channel and the right eye channel are simultaneously presented, a fixed time difference exists between the visual stimulus to the left eye from the original frame of the left eye channel and the visual stimulus to the right eye of the original frame of the right eye channel.

8. The method of claim 1, wherein the target frame sequences of the left eye channel and the right eye channel both have mask frames, and wherein a frame count of original frames between adjacent mask frames in the target frame sequence of the left eye channel is the same as a frame count of original frames between adjacent mask frames in the targe frame sequence of the right eye channel.

9. The method of claim 1, wherein acquiring the original frame sequences of the left eye channel and the right eye channel comprises: obtaining the original frame sequences of the left eye channel and the right eye channel by processing a frame sequence in a compressed image file by frame duplication with a frame rate multiplier of N, wherein, N is determined based on a relationship between a vertical refresh rate of a display device and a frame rate of the compressed image file.

10. A device for processing frame sequences, comprising: a memory for storing instructions; a controller for executing the instructions stored in the memory to perform operations comprising:

acquiring original frame sequences of a left eye channel and a right eye channel, wherein each of the original frame sequences includes multiple groups of consecutive frames, and wherein each group of consecutive frames includes multiple repetition frames; and replacing part of the repetition frames in the left eye channel and/or the right eye channel with mask frames to obtain a target frame sequence of the left eye channel and a target frame sequence of the right eye channel, wherein the mask frames are set so that when the target frame sequence of the left eye channel and the target frame sequence of the right eye channel are simultaneously presented, a visual stimulus from an original frame of the left eye channel to a left eye is ahead of a visual stimulus from an original frame of the right eye channel to a right eye; or, a visual stimulus from an original frame of the left eye channel to the left eye lags behind a visual stimulus from an original frame of the right eye channel to the right eye.

11. The device of claim 10, wherein replacing part of the repetition frames in the left eye channel and/or the right eye channel with mask frames comprises:

determining a mask frame parameter, wherein the mask frame parameter is used to determine a count of mask frames and/or the position of the mask frames in the original frame sequence; and replacing the part of repetition frames of the left eye channel and/or right eye channel according to the mask frame parameter.

12. The device of claim 11, wherein the determining mask frame parameters comprises:

receiving the mask frame parameter from a server; or acquiring the mask frame parameters from a local storage.

13. The device of claim 10, wherein the mask frames comprise a black frame, a white frame, or a frame formed by reducing brightness and/or contrast of an original frame.

14. The device of claim 10, wherein the controller is further configured to perform the operations comprising: causing a display device to simultaneously present the target frame sequences of the left eye channel and the right eye channel, respectively.

15. The device of claim 14, wherein causing the display device to simultaneously present the target frame sequences of the left eye channel and the right eye channel comprises:

controlling a presentation time of each frame in the target frame sequence of the left eye channel and/or the right eye channel on the display device, so that the presentation time of each frame is a reciprocal of a vertical refresh rate of the display device.

16. The device of claim 10, wherein when the mask frames are set so that the target frame sequences of the left eye channel and the right eye channel are simultaneously presented, a fixed time difference exists between the visual stimulus to the left eye from the original frame of the left eye channel and the visual stimulus to the right eye from the original frame of the right eye channel.

17. The device of claim 10, wherein the target frame sequences of the left eye channel and the right eye channel both have mask frames, and wherein a frame count of original frames between adjacent mask frames in the target frame sequence of the left eye channel is the same as a frame count of original frames between adjacent mask frames in the targe frame sequence of the right eye channel.

18. The device of claim 10, wherein acquiring the original frame sequences of the left eye channel and the right eye channel comprises:

obtaining the original frame sequences of the left eye channel and the right eye channel by processing a frame sequence in a compressed image file by frame duplication with a frame rate multiplier of N, wherein N is determined based on a relationship between a vertical refresh rate of a display device and a frame rate of the compressed image file.

19. A non-transitory machine-readable storage medium, storing instructions for executing the method of claim 1.

20. A system for treating visual dysfunction, comprising: a display device for displaying image sequences; and a control device for controlling the display device to simultaneously present target frame sequences of the left eye channel and the right eye channel, wherein the target frame sequences of the left eye channel and/or the right eye channel include alternately appearing original frames and mask frames, and the setting of the mask frames is such that a visual stimulus from an original frame of the left eye channel to the left eye of a user of the display device is ahead of a visual stimulus from an original frame of the right eye channel to the right eye of the user; or, a visual stimulus from an original frame of the left eye channel to the left eye of the user of the display device lags behind a visual stimulus from an original frame of the right eye channel to the right eye of the user of the display device.

* * * * *